(12) United States Patent
Ahmed et al.

(10) Patent No.: US 11,481,335 B2
(45) Date of Patent: Oct. 25, 2022

(54) METHODS FOR USING EXTENDED PHYSICAL REGION PAGE LISTS TO IMPROVE PERFORMANCE FOR SOLID-STATE DRIVES AND DEVICES THEREOF

(71) Applicant: NetApp, Inc., Sunnyvale, CA (US)

(72) Inventors: Reyaz Ahmed, Fremont, CA (US); Douglas Coatney, San Jose, CA (US)

(73) Assignee: NETAPP, INC., San Jose, CA (US)

( * ) Notice: Subject to any disclaimer, the term of this patent is extended or adjusted under 35 U.S.C. 154(b) by 497 days.

(21) Appl. No.: 16/523,980

(22) Filed: Jul. 26, 2019

(65) Prior Publication Data

US 2021/0026780 A1 Jan. 28, 2021

(51) Int. Cl.
*G06F 12/1009* (2016.01)
*G06F 13/16* (2006.01)
*G06F 3/06* (2006.01)

(52) U.S. Cl.
CPC .......... *G06F 12/1009* (2013.01); *G06F 3/061* (2013.01); *G06F 3/065* (2013.01); *G06F 3/0659* (2013.01); *G06F 3/0679* (2013.01); *G06F 13/1673* (2013.01); *G06F 2212/214* (2013.01)

(58) Field of Classification Search
CPC ...... G06F 12/1009; G06F 3/061; G06F 3/065; G06F 3/0659; G06F 3/0679
See application file for complete search history.

(56) References Cited

U.S. PATENT DOCUMENTS

| 2009/0292861 | A1* | 11/2009 | Kanevsky | G06F 3/061 |
| | | | | 711/103 |
| 2010/0083247 | A1* | 4/2010 | Kanevsky | G06F 13/28 |
| | | | | 718/1 |
| 2012/0069664 | A1 | 3/2012 | Kim et al. | |
| 2012/0110249 | A1* | 5/2012 | Jeong | G06F 3/0659 |
| | | | | 711/103 |
| 2017/0308329 | A1* | 10/2017 | A | G06F 3/0656 |

* cited by examiner

*Primary Examiner* — Baboucarr Faal
(74) *Attorney, Agent, or Firm* — Troutman Pepper Hamilton Sanders LLP

(57) ABSTRACT

Methods, non-transitory machine readable media, and computing devices that use extended physical region page (PRP) lists to improve storage device performance are disclosed. With this technology, a PRP list is generated that includes pointers retrieved from a scatter/gather list (SGL) for memory buffers representing data segments associated with a storage operation. The PRP list is extended to include a pointer to an allocated memory page configured to store metadata segments represented by other memory buffers referenced by other pointers in the SGL. A command request that includes the extended PRP list is submitted to a storage device for execution of the storage operation. With this technology, storage operations are advantageously enabled for non-volatile memory express (NVMe) solid-state drive (SSDs), for example, that do not support SGL transfers.

20 Claims, 4 Drawing Sheets

METHODS FOR USING EXTENDED PHYSICAL REGION PAGE LISTS TO IMPROVE PERFORMANCE FOR SOLID-STATE DRIVES AND DEVICES THEREOF

FIELD

This technology relates to data storage systems and networks and, more particularly, to methods and devices for improving performance of storage devices, including solid-state drives (SSDs), using extended physical region page (PRP) lists.

BACKGROUND

Data storage networks often include storage servers and other types of devices hosting applications that store data on storage devices that use flash (e.g., not-and (NAND) flash) media, such as peripheral component interconnect express (PCIe) non-volatile memory (NVMe) solid-state drives (SSDs). Some types of such SSDs, which are generally less expensive and often referred to as consumer class SSDs, do not support certain features that are supported by other types of SSDs, often referred to as enterprise class SSDs, which may be critical for certain enterprise applications.

In particular, controllers of consumer class SSDs perform data transfers using physical region page (PRP) lists, and do not support data transfer through a list of scatter/gather buffers, referred to herein as scatter/gather lists (SGLs). Data transfer from a host to an SSD generally requires interleaving metadata (e.g., in 64 byte segments) within a stream of data (e.g., in 4 kb segments) at fixed offsets.

Without the support of SGLs from a consumer class SSD, the host storage stack could be rewritten to switch to PRP-based data transfers. However, such rewriting requires significant resources and is not feasible in many deployments. Another option for consumer class SSDs is to perform a double copying of data buffers or segments to align them in 4 kb size pages, for example, to conform to the PRP alignment, as described in the NVMe specification, which significantly reduces storage device performance.

DETAILED DESCRIPTION

Figure 1:
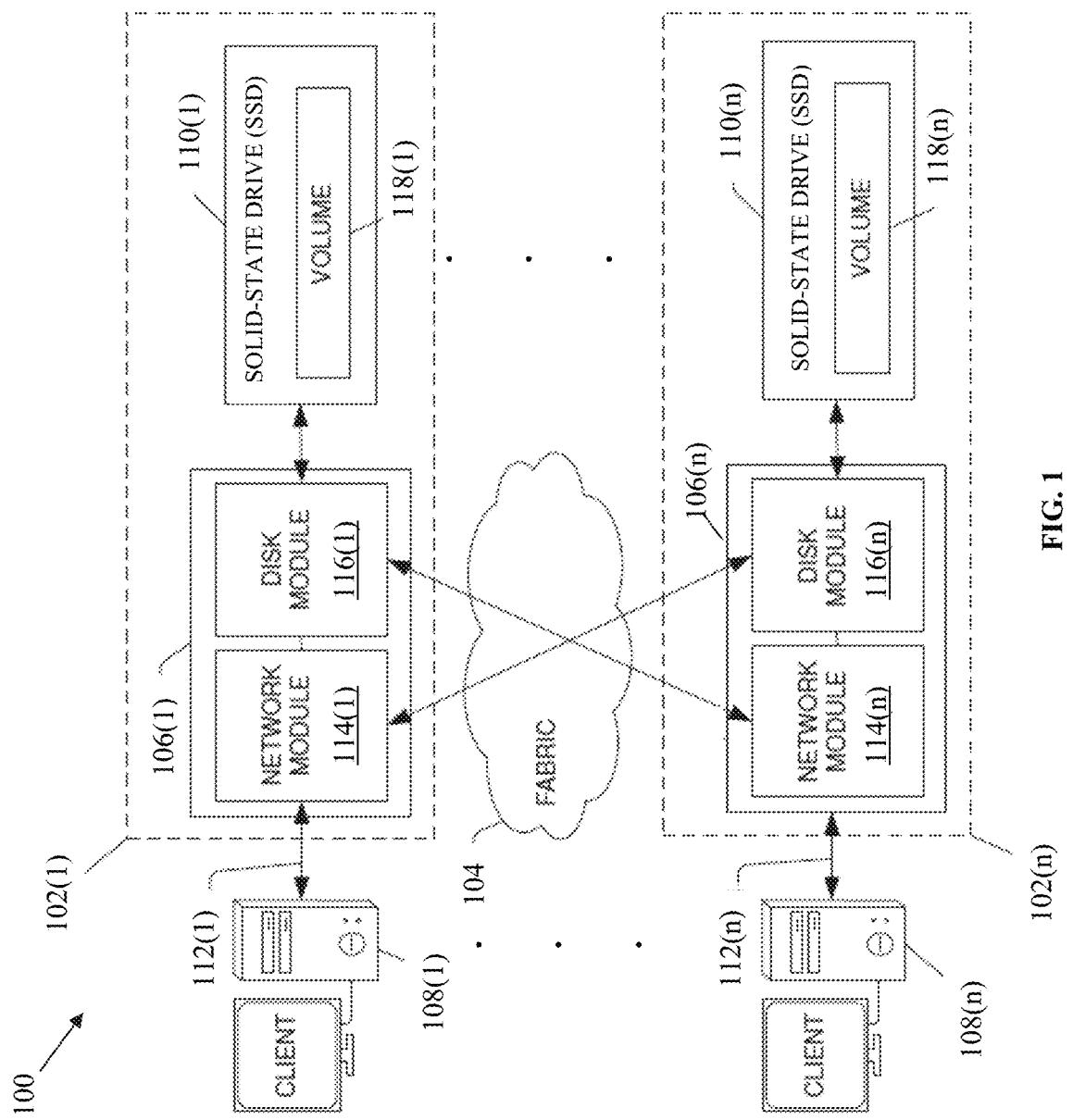
FIG. 1 is a block diagram of a network environment with exemplary host computing devices.

A clustered network environment 100 that may implement one or more aspects of the technology described and illustrated herein is shown in FIG. 1. The clustered network environment 100 includes host computing devices 102(1)-102(n) that are coupled over a cluster or data fabric 104 that includes one or more communication network(s) and facilitates communication between the host computing devices 102(1)-102(n) (and one or more modules, components, etc. therein, such as, nodes 106(1)-106(n), for example), although any number of other elements or components can also be included in the clustered network environment 100 in other examples. This technology provides a number of advantages including methods, non-transitory computer readable media, and computing devices that improve performance of consumer class peripheral component interconnect express (PCIe) non-volatile memory (NVMe) solid-state drives (SSDs) using extended physical region page (PRP) lists to perform data transfers.

In this example, nodes 106(1)-106(n) of the host computing devices 102(1)-102(n) can be primary or local storage controllers or secondary or remote storage controllers that provide client devices 108(1)-108(n) with access to data stored within SSDs 110(1)-110(n). The host computing devices 102(1)-102(n) of the examples described and illustrated herein are not limited to any particular geographic areas and can be clustered locally and/or remotely. Thus, in one example the host computing devices 102(1)-102(n) can be distributed over a plurality of storage systems located in a plurality of geographic locations; while in another example a clustered network can include host computing devices 102(1)-102(n) residing in a same geographic location (e.g., in a single on-site rack).

In the illustrated example, one or more of the client devices 108(1)-108(n), which may be, for example, personal computers (PCs), computing devices used for storage (e.g., storage servers), or other computers or peripheral devices, are coupled to the respective host computing devices 102(1)-102(n) by network connections 112(1)-112(n). Network connections 112(1)-112(n) may include a local area network (LAN) or wide area network (WAN), for example, that utilize Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 108(1)-108(n) may be general-purpose computers running applications and may interact with the host computing devices 102(1)-102(n) using a client/server model for exchange of information. That is, the client devices 108(1)-108(n) may request data from the host computing devices 102(1)-102(n) (e.g., data on one of the SSDs 110(1)-110(n) managed by a network storage controller configured to process I/O commands issued by the client devices 108(1)-108(n)), and the host computing devices 102(1)-102(n) may return results of the requests to the client devices 108(1)-108(n) via the network connections 112(1)-112(n).

While the host computing devices 102(1)-102(n) are disclosed in this example as including only SSDs 110(1)-110(n) for storage, other types of mass storage devices including hard disk drives (HDDs), magnetic disk drives, and any other similar media adapted to store information, including, for example, data, metadata, and/or parity information, can also be utilized by the host computing devices 102(1)-102(n) in other examples.

The nodes 106(1)-106(n) can include network or host nodes that are interconnected as a cluster to provide data storage and management services, such as to an enterprise having remote locations, cloud storage, etc., for example. Such nodes 106(1)-106(n) can be attached to the fabric 104 at a connection point, redistribution point, or communication endpoint, for example. One or more of the host computing devices 106(1)-106(n) may be capable of sending, receiving, and/or forwarding information over a network communications channel, and could comprise any type of device that meets any or all of these criteria.

In an example, the nodes 106(1) and 106(n) may be configured according to a disaster recovery configuration whereby a surviving takeover node provides switchover access to the SSDs 110(1)-110(n) in the event a failure or planned takeover event occurs (e.g., the node 106(1) provides client device 108(n) with switchover data access to SSD 110(1)). Additionally, while two nodes and host computing devices are illustrated in FIG. 1, any number of nodes or host computing devices can be included in the clustered network environment 100 other examples in other types of configurations or arrangements.

As illustrated in the clustered network environment 100, nodes 106(1)-106(n) can include various functional components that coordinate to provide distributed storage architecture. For example, the nodes 106(1)-106(n) can include network modules 114(1)-114(n) and disk modules 116(1)-116(n). Network modules 114(1)-114(n) can be configured to allow the nodes 106(1)-106(n) (e.g., network storage controllers) to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node 106(1) can access the SSD 110(n) by sending a request via the cluster fabric 104 through the disk module 116(n) of node 106(n). The cluster fabric 104 can include one or more local and/or wide area computing networks embodied as Infiniband, Fibre Channel (FC), or Ethernet networks, for example, although other types of networks supporting other protocols can also be used.

In some examples, the disk modules 116(1)-116(n) can be configured to connect the SSDs 110(1)-110(n) to the nodes 106(1)-106(n) via a PCIe bus. In these examples, the disk modules 116(1)-116(n) communicate with the SSDs 110(1)-110(n) according to Fabric protocols, such as NVMe, for example, although other protocols can also be used. Thus, as seen from an operating system on node computing devices 106(1)-106(n), the SSDs 110(1)-110(n) can appear as locally attached. In this manner, different nodes 106(1)-106(n) may access data blocks, files, or objects through the operating system, rather than expressly requesting abstract files.

While the clustered network environment 100 illustrates an equal number of network modules 114(1)-114(n) and disk modules 116(1)-116(n), other examples may include a differing number of these modules. For example, there may be a plurality of network and disk modules interconnected in a cluster that do not have a one-to-one correspondence between the network and disk modules. That is, different nodes can have a different number of network and disk modules, and the same node can have a different number of network modules than disk modules.

Further, one or more of the client devices 108(1)-108(n) can be networked with the nodes 106(1)-106(n) in the cluster, over the storage connections 112(1)-112(n). As an example, respective client devices 108(1)-108(n) that are networked to a cluster may request services (e.g., exchanging of information in the form of data packets) of nodes 106(1)-106(n) in the cluster, and the nodes 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the host computing devices 102(1)-102(n).

In one example, the host computing devices 102(1)-102(n) host aggregates corresponding to physical local and/or remote data storage devices, such as flash media in the SSDs 110(1)-110(n), for example. One or more of the SSDs 110(1)-110(n) can include mass storage devices, such as disks of a disk array. In this particular example, the SSDs 110(1)-110(n) include device memory hosting controller firmware (e.g., dynamic random access memory (DRAM) and flash media, as described and illustrated in more detail later with reference to FIG. 2.

The aggregates in this example include volumes 118(1)-118(n), which are virtual data stores or storage objects that define an arrangement of storage and one or more filesystems within the clustered network environment 100. Volumes 118(1)-118(n) can span a portion of a disk or other storage device, a collection of disks, or portions of disks, for example, and typically define an overall logical arrangement of data storage. In one example, volumes 118(1)-118(n) can include stored user data as one or more files, blocks, or objects that reside in a hierarchical directory structure within the volumes 118 (1)-118(n).

Volumes 118(1)-118(n) are typically configured in formats that may be associated with particular storage systems, and respective volume formats typically comprise features that provide functionality to the volumes 118(1)-118(n), such as providing the ability for volumes 118(1)-118(n) to form clusters, among other functionality. Optionally, one or more of the volumes 118(1)-118(n) can be in composite aggregates and can extend between one or more of the SSDs 110(1)-110(n) and, optionally, one or more cloud storage device(s) (not shown) to provide tiered storage, for example, and other arrangements can also be used in other examples.

To facilitate access to data stored on the SSDs 110(1)-110(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the SSDs 110(1)-110(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

Figure 2:
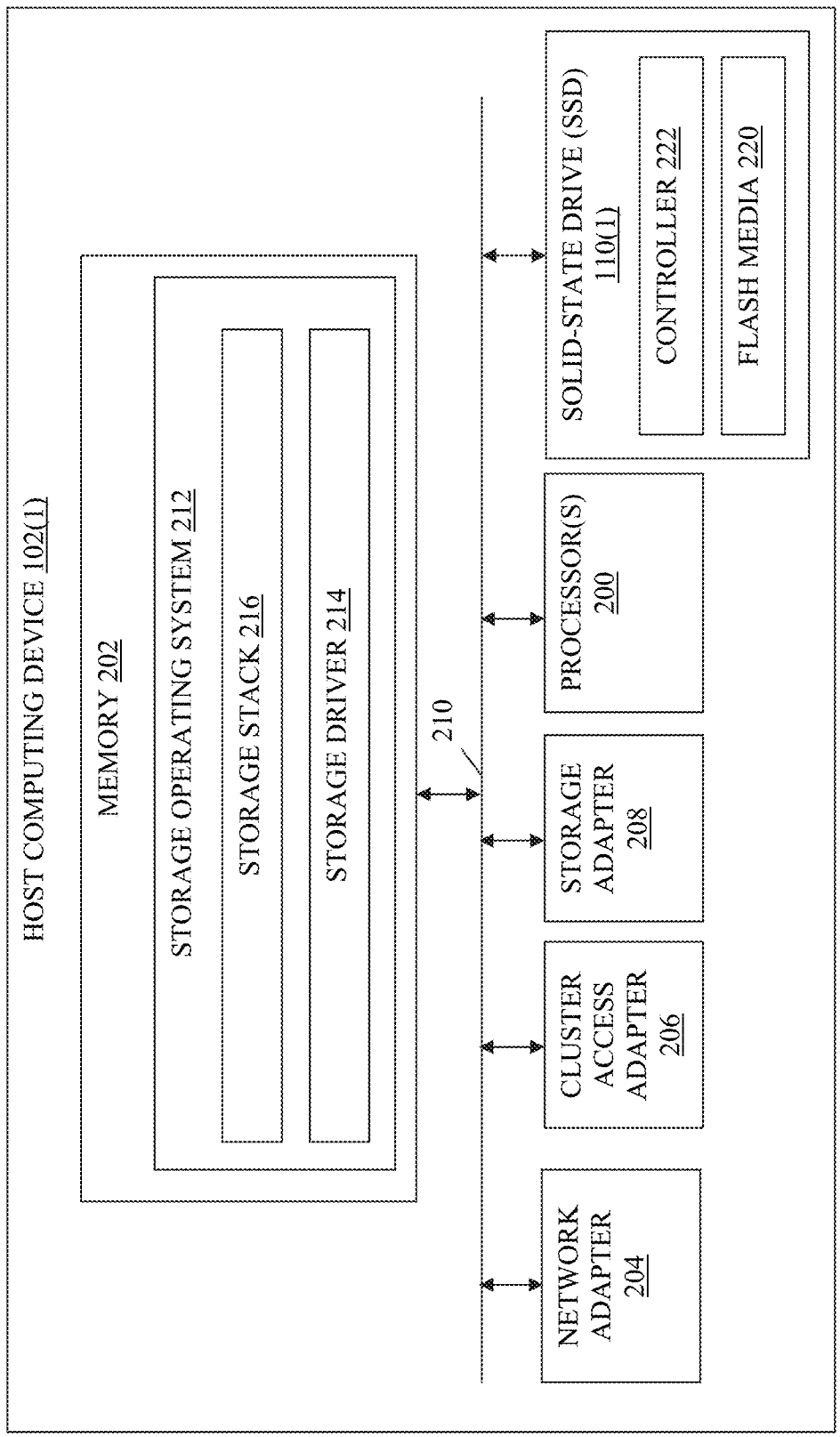
FIG. 2 is a block diagram of an exemplary host computing device.

Referring to FIG. 2, host computing device 102(1) in this particular example includes processor(s) 200, a memory 202, a network adapter 204, a cluster access adapter 206, a storage adapter 208, and an SSD 110(1) interconnected by a system bus 210 (e.g., a PCIe bus). The host computing device 102(1) also includes applications including a storage operating system 212 installed in the memory 202 that can, for example, implement a RAID data loss protection and recovery scheme to optimize reconstruction of data of a failed disk or drive in an array. In some examples, the host computing device 102(n) is substantially the same in structure and/or operation as host computing device 102(1), although the host computing device 102(n) can also include a different structure and/or operation in one or more aspects than the host computing device 102(1).

The network adapter 204 in this example includes the mechanical, electrical and signaling circuitry needed to connect the host computing device 102(1) to one or more of the client devices 108(1)-108(n) over network connections 112(1)-112(n), which may comprise, among other things, a point-to-point connection or a shared medium, such as a local area network. In some examples, the network adapter 204 further communicates (e.g., using TCP/IP) via the cluster fabric 104 and/or another network (e.g. a WAN) with cloud storage device(s) (not shown) to process storage operations associated with data stored thereon.

The storage adapter 208 cooperates with the storage operating system 212 executing on the host computing device 102(1) to access information requested by the client devices 108(1)-108(n) (e.g., to access data on the SSD 110(1)). In some examples, the SSD 110(1) stores a cache for data maintained on one or more other data storage devices (not shown) coupled to the host computing device 102(1). The data maintained on the other data storage devices may be stored on any type of attached array of writeable media such as magnetic disk drives, flash memory, and/or any other similar media adapted to store information.

In the data storage devices and/or the SSD 110(1), information can be stored in data blocks. The storage adapter 208 can include I/O interface circuitry that couples to the data storage devices over an I/O interconnect arrangement, such as a storage area network (SAN) protocol (e.g., Small Computer System Interface (SCSI), Internet SCSI (iSCSI), hyperSCSI, Fiber Channel Protocol (FCP)). Information retrieved by the storage adapter 208 and can be processed by the processor(s) 200 (or the storage adapter 208 itself) prior to being forwarded over the system bus 210 to the network adapter 204 (and/or the cluster access adapter 206 if sending to another node in the cluster) where the information is formatted into a data packet and returned to a requesting one of the client devices 108(1)-108(n) and/or sent to another node attached via the cluster fabric 104.

In some examples, a storage driver 214 in the storage operating system 212 interfaces with the storage adapter 208 to facilitate interactions with the data storage devices. In particular, the storage driver 214 is used to communicate device commands and read/write requests to disk devices (not shown), as well as the host-managed SSD 110(1) using the NVMe protocol. More specifically, the storage driver 214 in this example communicates command requests to a controller 222 of the SSD 110(1) to execute read/write storage operations on the flash media 220 (e.g., not-and (NAND) flash memory).

The storage driver 214 further communicates with upper layers of the storage stack 216, which receive and process requests from enterprise class applications, which may be executing on the client devices 108(1)-108(n), for example. The storage driver 214 receives SGLs associated with storage operations from the storage stack 216, and generates and submits extended PRP lists to the controller 222 for execution of the storage operations, as described and illustrated in more detail later with reference to FIGS. 3-4. In this example, the SSD 110(1) is a consumer class or other type of SSD that does not support SGLs or otherwise does not have SGL support enabled.

The storage operating system 212 in this example can also manage communications for the host computing device 102(1) among other devices that may be in a clustered network, such as attached to a cluster fabric 104. Thus, the host computing device 102(1) can respond to client requests to manage data on the SSD 110(1), other data storage devices, or cloud storage device(s) (e.g., or additional clustered devices) in accordance with the client requests.

In some examples, the storage operating system 212 includes a file system module (not shown) that can establish and manage one or more filesystems including software code and data structures that implement a persistent hierarchical namespace of files and directories, for example. As an example, when a new data storage device (not shown) is added to a clustered network system, the file system module is informed where, in an existing directory tree, new files associated with the new data storage device are to be stored. This is often referred to as "mounting" a filesystem.

In the example host computing device 102(1), the memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212 also invokes storage operations in support of a file service implemented by the host computing device 102(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

The examples of the technology described and illustrated herein may be embodied as one or more non-transitory computer readable media (e.g., memory 202) having machine or processor-executable instructions stored thereon for one or more aspects of the present technology, which when executed by one or more processors (e.g., processor(s) 200), cause the processor to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-4, for example.

Figure 3:
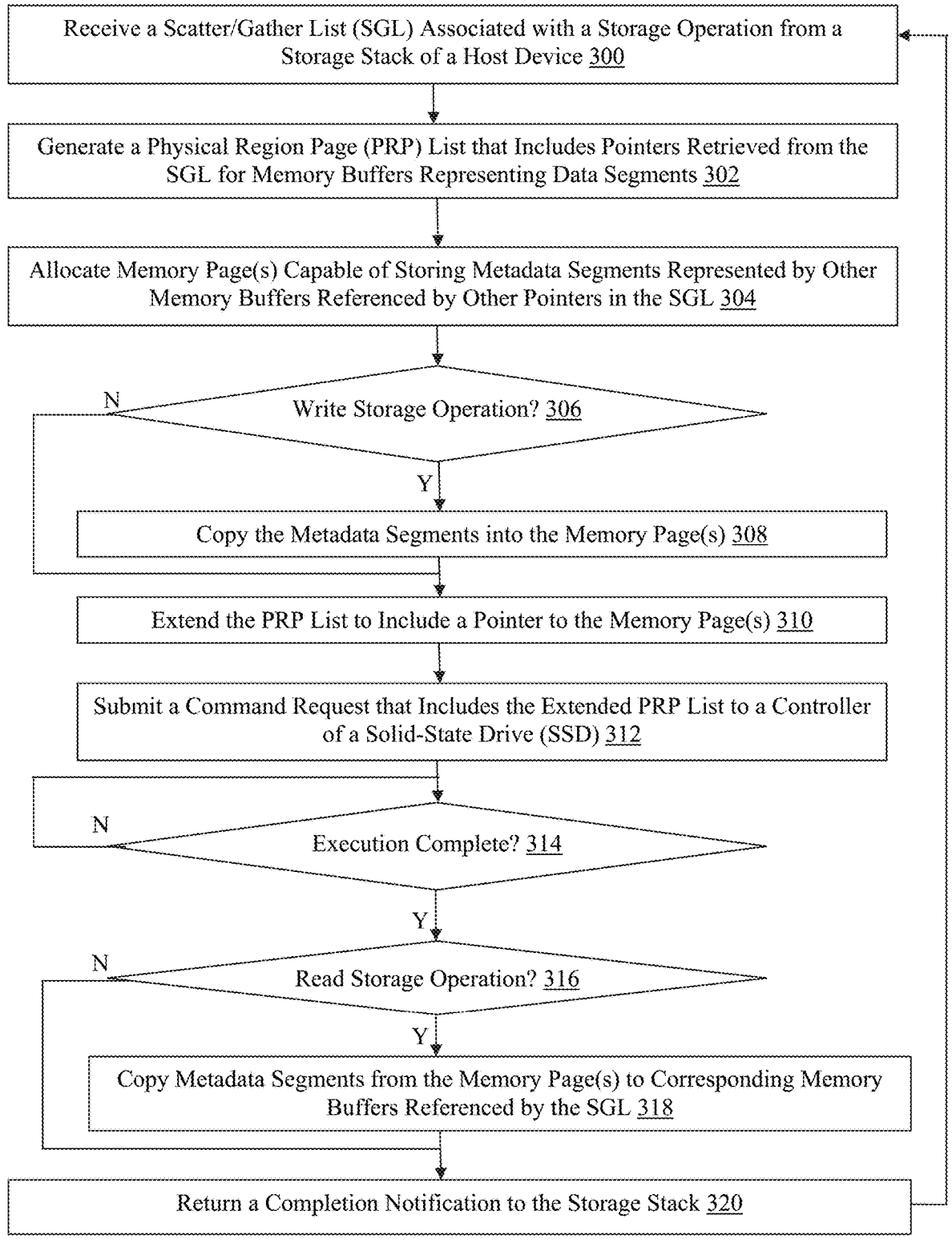
FIG. 3 is a flowchart of an exemplary method for using extended physical region page (PRP) lists to improve storage device performance.

Referring more specifically to FIG. 3, a flowchart illustrating an exemplary method for using extended PRP lists to improve storage device performance is illustrated. In step 300 in this example, the storage driver 214 of the host computing device 102(1) receives an SGL associated with a storage operation from the storage stack 216. The storage operation can be a read or a write operation, for example, associated with data stored on, or to be stored on, the SSD 110(1). The SGL can include pointers to buffers in the memory 202 of the host computing device 102(1) storing, or to be used to store, data and metadata segments associated with the storage operation.

The storage stack 216 can include layers that process a storage request from an application, for example, resulting in the SGL that is communicated to the storage driver 214 in step 300. Accordingly, the storage stack 216 in this example is optimized to utilize SGLs under the assumption that the SSD 110(1) is an enterprise class SSD that has SGL functionality enabled. As described and illustrated herein, this technology enables data transfers based on SGLs without rewriting the storage stack 116 and even though the SSD 110(1) is a consumer class SSD or otherwise does not have SGL support enabled, and instead utilizes PRP-based data transfers.

In step 302, the storage driver 214 of the host computing device 102(1) generates a PRP list that includes a subset of the pointers of the SGL that correspond to memory buffers that represent data segments associated with the storage operation. For a write storage operation, the memory buffers store data segments to be written to the SSD 110(1) and, for a read storage operation, the memory buffers are to be used to store data segments received from the SSD 110(1).

In step 304, the storage driver 214 of the host computing device 102(1) allocates memory page(s) (e.g., in memory 202) capable of storing metadata segments (e.g., checksum information) represented by other memory buffers referenced by another subset of the pointers of the SGL. The storage driver 214 allocates a sufficient number of memory page(s) capable of storing the metadata segments.

In one example, the memory buffers representing data segments are 4 kb and the memory buffers representing metadata segments are 64 bytes in size. Additionally, in this example, a size of each of the allocated memory page(s) corresponds to a size of each of the memory buffers representing the data segments (i.e., 4 kb or 4096 bytes). Accordingly, if the SGL includes fewer than 64 pointers to memory buffers representing metadata segments, the storage driver 214 allocates only one memory page. Other sizes for the memory buffers representing data segments, memory buffers representing metadata segments, and/or the allocated memory page(s) can also be used in other examples.

In step 306, the storage driver 214 of the host computing device 102(1) determines whether the storage operation is a write storage operation. The determination in step 306 can be based on information communicated from upper layers of the storage stack 216, a format of the storage operation, or any other indication of the type of the storage operation. If the host computing device 102(1) determines that the storage operation is a write storage operation, then the Yes branch is taken to step 308.

In step 308, the storage driver 214 of the host computing device 102(1) copies the metadata segments into the memory page(s) allocated in step 304. The storage driver 214 can retrieve the metadata segments from the memory buffers identified by the subset of the pointers in the SGL that reference the memory buffers representing the metadata segments.

The copying of the metadata segments is relatively inexpensive since the size of each of the metadata segments is relatively small as compared to the size of data segments associated with a storage operation. Subsequent to copying the metadata segments, or if the host computing device 102(1) determines in step 306 that the storage operation is not a write storage operation (i.e. it is a read storage operation) and the No branch is taken, then the host computing device 102(1) proceeds to step 310.

In step 310, the storage driver 214 of the host computing device 102(1) extends the generated PRP list to include pointer(s) to the memory page(s) allocated in step 304. In one example, the pointer(s) (e.g., address(es)) to the memory page(s) are appended to the end of the PRP list that includes the subset of pointers of the SGL that reference memory buffers representing data segments, which were previously inserted into the PRP list, as described and illustrated earlier with reference to step 302, although the pointer(s) to the allocated memory page(s) that include the metadata segments can be prepended to, or included elsewhere in, the generated PRP list in other examples. Optionally, the added pointer(s) are each marked or otherwise identified to indicate to the controller 222 that they reference memory page(s) referencing memory buffers representing metadata segments.

In step 312, the storage driver 214 of the host computing device 102(1) submits a command request that includes the extended PRP list to the controller 222 of the SSD 110(1), although the command request can be submitted to other entities and/or types of hardware, software, or firmware, and other types of storage devices can also be used in other examples. The command request generally instructs the controller 222 to execute the storage operation based on the PRP list, which is the type of data transfer supported by the SSD 110(1) in this example.

In this particular example, the SSD 110(1) is configured to interleave the metadata segments and the data segments in the flash media 220 based on the contents of the extended PRP list, when the storage operation is a write storage operation. The metadata is retrieved based on the pointer to the allocated memory page(s) in the extended PRP list included in the command request. When the storage operation is a read storage operation, the controller 222 is configured to retrieve the metadata segments from the flash media 220 based on the contents of the memory page(s) pointed to by the pointer included to extend the PRP list in step 310.

In step 314, the storage driver 214 of the host computing device 102(1) determines whether execution of the storage operation by the controller 22 is complete. In some example, the controller 222 is configured to respond to the command request with a completion message when execution of the storage operation is complete, although other types of communications or indications that the execution of the storage operation has completed can also be used in other examples. If the host computing device 102(1) determines that execution is not complete, then the No branch is taken back to step 314 and the storage driver 214 effectively waits for execution of the storage operation to complete in this example. However, if the host computing device 102(1) determines that execution of the storage operation has completed, then the Yes branch is taken to step 316.

In step 316, the storage driver 214 of the host computing device 102(1) determines whether the storage operation that has been executed by the controller 222 of the SSD 110(1) is a read storage operation. The determination can be based on the same or different attributes as described earlier with reference to step 306. If the host computing device 102(1) determines that the storage operation is a read storage operation, then the Yes branch is taken to step 318.

In step 318, the storage driver 214 of the host computing device 102(1) copies metadata segments from the memory page(s) allocated in step 304 to corresponding memory buffers referenced by the SGL received from the storage stack 216 in step 300. In this example, the controller 222 is configured to store all of the metadata segments associated with the read storage operation in the memory page(s) allocated in step 304 and identified by pointer in the extended PRP list sent to the controller 222 in step 312 with the command request.

Accordingly, the host computing device 102(1) copies the metadata segments from the memory page(s) into buffers in the memory 202, for example, at locations corresponding to the subset of pointers in the SGL that reference the memory buffers representing metadata segments. Therefore, the metadata segments will be stored in locations expected by the upper layers of the storage stack 216. Subsequent to copying the metadata segments in step 318, or if the host computing device 102(1) determines in step 316 that the storage operation is not a read storage operation (i.e., it is a write storage operation) and the No branch is taken, then the host computing device 102(1) proceeds to step 320.

In step 320, the storage driver 214 of the host computing device 102(1) returns a completion notification to the storage stack 216. The completion notification can be in the form of a message or any other type of notification or indication, for example.

The storage stack 216 can then utilize the SGL to formulate, verify, and/o/r return a response (e.g., to an application), which can be in the form of a confirmation in the case of a write storage operation or requested data (i.e., an integrated version of the data segments) in the case of a read storage operation. Subsequent to returning the completion notification in step 320, the host computing device 102(1) returns to step 300 in this example and receives another SGL. In other examples, one or more of steps 300-320 can occur in a different order and/or in parallel for another number of storage operations.

Figure 4:
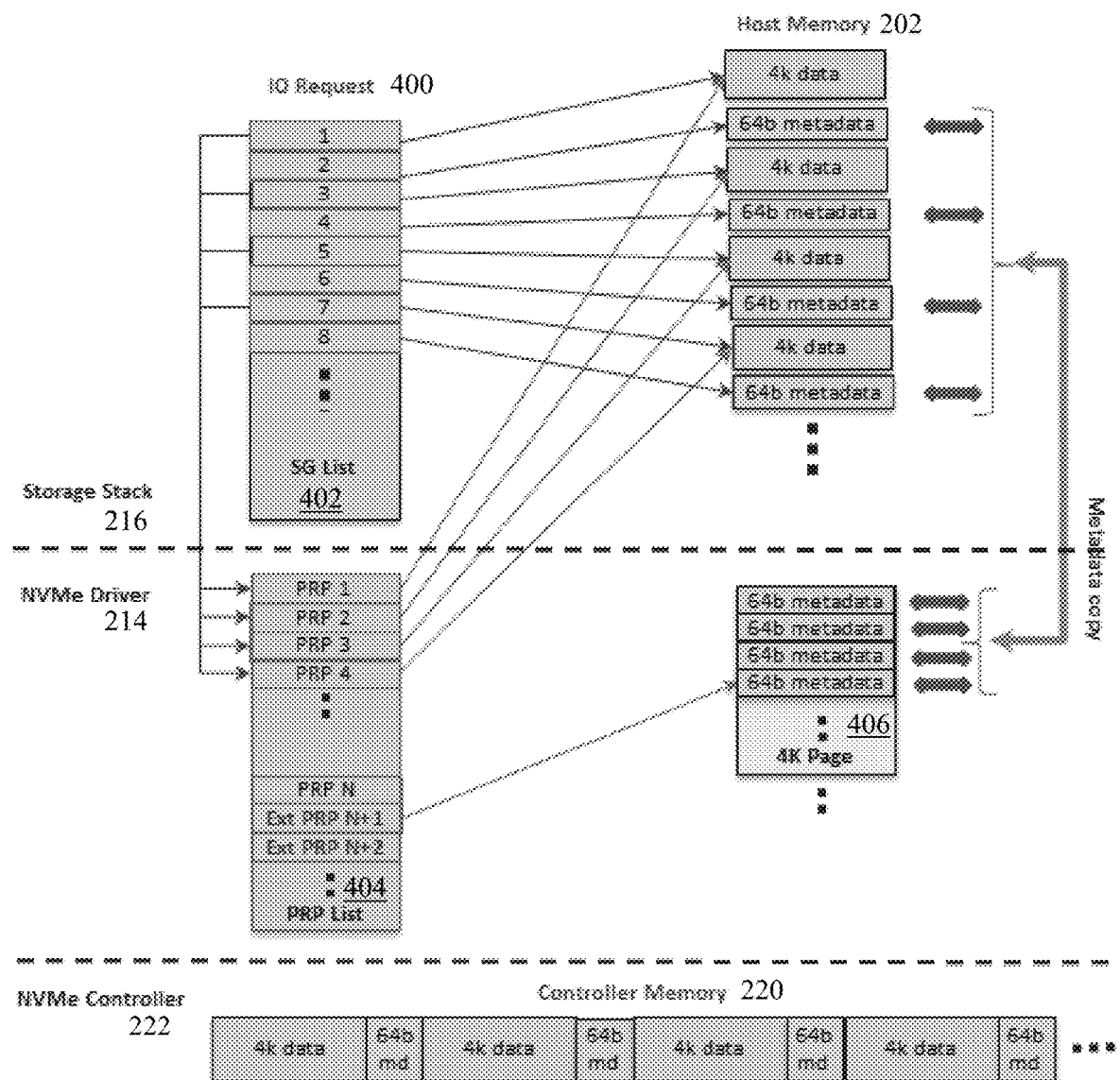
FIG. 4 is functional block diagram of an exemplary method for using extended PRP lists to improve storage device performance.

Referring more specifically to FIG. 4, a functional flow diagram of an exemplary method for using extended PRP lists to improve storage device performance is illustrated. In this example, the host computing device 102(1) receives a request from an application for a write storage operation, which is referred to in FIG. 4 as an I/O request. The storage stack 216 generates an SGL 402 that is associated with the write storage operation 400. The SGL 402 includes pointers to buffers in the host memory 202 that store data segments and metadata segments associated with the write storage operation 400.

The storage stack 216 of the host computing device 102(1) communicates the SGL 402 to the storage driver 214, which is referred to in FIG. 4 as an NVMe driver. The storage driver 214 then generates a PRP list 404 that includes the pointers from the SGL 402 that correspond with the buffers in the host memory 202 storing data segments. Next, the storage driver 214 retrieves the metadata segments based on the pointers in the SGL 402 that correspond with buffers in the host memory 202 storing the metadata segments, and copies the metadata segments.

The storage driver 214 subsequently allocates a memory page 406 and stores the copied metadata segments in the allocated memory page 406. In this example, the allocated memory page is 4 kb, the data segments are each 4 kb, and the metadata segments are each 64 bytes, but other sizes can also be used in other examples. Accordingly, the metadata segments are collected by the storage driver 214 and stored at a newly-allocated memory page 406.

Then, the storage driver 214 extends the PRP list 404 by inserting a pointer to the allocated memory page 406 at which the copied metadata segments are stored. Accordingly, the extended PRP list 404 includes pointers to each of the buffers in the host memory 202 storing data segments associated with the write storage operation 400 and an additional pointer to the allocated memory page 406 at which all of the metadata segments associated with the write storage operation 400 have been copied. Any number of memory pages can be allocated as required by the collective size of the metadata segments, and any number of corresponding pointers can be added to the PRP list 404 in order to generate the extended PRP list 404.

Subsequently, the storage driver 214 sends a command request to the controller 222, which is referred to in FIG. 4 as an NVMe controller. The command request sent to the controller 222 by the storage driver 214 includes the extended PRP list 404 in this example. The controller 222 is configured to process the extended PRP list 404 to extract the pointer to the allocated memory page 406 storing metadata segments from the extended PRP list 404. The pointer can optionally be identified by the controller based on an associated marking or indication introduced by the storage driver 214 subsequent to appending the pointer to the PRP list 404, for example.

The controller 222 is further configured to retrieve the metadata segments stored in the memory page 406 corresponding to the extracted pointer, and interleave the metadata segments in the flash media 220, referred to in FIG. 4 as controller memory, with data segments referenced by the remainder of the pointers of the PRP list 404 communicated with the command request to satisfy the required layout on the SSD 110(1). Optionally, the controller 222 communicates an indication that the write storage operation is complete to the storage driver 214, which communicates a corresponding communication to the storage stack 216, for example.

With this technology, performance can be improved for data transfers from host devices to consumer class or other types of SSDs that do not support SGL functionality. Advantageously, a storage driver generates a PRP list using the contents of an SGL generated by a storage stack, and extends the PRP list to include a pointer to an allocated memory page configured to store metadata associated with a storage operation. Accordingly, this technology improves storage device performance without requiring any rewriting of the storage stack to utilize PRP-based data transfers or any relatively expensive copying of data segments.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
 generating, by a computing device, a physical region page (PRP) list comprising pointers retrieved from a scatter/ gather list (SGL) for memory buffers representing data segments associated with a storage operation;

allocating, by the computing device, a memory page in a memory of the computing device;

copying, by the computing device, metadata segments associated with the storage operation from other memory buffers referenced by other pointers in the SGL into the allocated memory page;

extending, by the computing device, the PRP list to include a pointer to the allocated memory page; and submitting, by the computing device, a command request that includes the extended PRP list to a storage device for execution of the storage operation.

2. The method of claim 1, wherein the storage operation comprises a write request and the method further comprises copying, by the computing device, the metadata segments into the allocated memory page from the other memory buffers prior to submitting the command request.

3. The method of claim 1, further comprising receiving, by a storage driver of the computing device, the SGL from a storage stack of the computing device following issuance of a storage request by an application executed by the computing device, wherein the storage device is configured to utilize PRP-based data transfers and lacks SGL support.

4. The method of claim 1, wherein the storage device comprises a solid-state drive (SSD) and the command request is submitted by a storage driver to a non-volatile memory express (NVMe) controller of the SSD.

5. The method of claim 1, wherein the storage device is configured to interleave the metadata segments, retrieved based on the pointer to the allocated memory page in the extended PRP list, and the data segments in flash media of the storage device.

6. The method of claim 1, wherein a size of the allocated memory page corresponds to a size of each of the memory buffers representing the data segments.

7. A non-transitory machine readable medium having stored thereon instructions for improved storage device performance, the instructions comprising machine executable code that, when executed by at least one machine, causes the machine to:

generate a physical region page (PRP) list comprising pointers retrieved from a scatter/gather list (SGL) for memory buffers representing data segments associated with a storage operation;

allocate a memory page in a memory of the machine;

copy metadata segments associated with the storage operation from other memory buffers referenced by other pointers in the SGL into the allocated memory page;

extend the PRP list to include a pointer to the allocated memory page; and submit a command request that includes the extended PRP list to a storage device for execution of the storage operation.

8. The non-transitory machine readable medium of claim 7, wherein the storage operation comprises a write request and the machine executable code, when executed by the machine, further causes the machine to copy the metadata segments into the allocated memory page from the other memory buffers prior to submitting the command request.

9. The non-transitory machine readable medium of claim 7, wherein the machine executable code, when executed by the machine, further causes the machine to receive, by a storage driver of the machine, the SGL from a storage stack of the machine following issuance of a storage request by an application executed by the machine, wherein the storage device is configured to utilize PRP-based data transfers and lacks SGL support.

10. The non-transitory machine readable medium of claim 7, wherein the storage device comprises a solid-state drive (SSD) and the command request is submitted by a storage driver to a non-volatile memory express (NVMe) controller of the SSD.

11. The non-transitory machine readable medium of claim 7, wherein the storage device is configured to interleave the metadata segments, retrieved based on the pointer to the allocated memory page in the extended PRP list, and the data segments in flash media of the storage device.

12. The non-transitory machine readable medium of claim 7, wherein a size of the allocated memory page corresponds to a size of each of the memory buffers representing the data segments.

13. A computing device, comprising:

a memory containing machine readable medium comprising machine executable code having stored thereon instructions for improved storage device performance; and a processor coupled to the memory, the processor configured to execute the machine executable code to cause the processor to:

generate a physical region page (PRP) list comprising pointers retrieved from a scatter/gather list (SGL) for memory buffers representing data segments associated with a storage operation;

allocate a memory page in the memory;

copy metadata segments associated with the storage operation from other memory buffers referenced by other pointers in the SGL into the allocated memory page;

extend the PRP list to include a pointer to the allocated memory page; and submit a command request that includes the extended PRP list to a storage device for execution of the storage operation.

14. The computing device of claim 13, wherein the storage operation comprises a write request and the processor is further configured to execute the machine executable code to further cause the processor to copy the metadata segments into the allocated memory page from the other memory buffers prior to submitting the command request.

15. The computing device of claim 13, wherein the processor is further configured to execute the machine executable code to further cause the processor to receive, by a storage driver of the computing device, the SGL from a storage stack of the computing device following issuance of a storage request by an application executed by the computing device, wherein the storage device is configured to utilize PRP-based data transfers and lacks SGL support.

16. The computing device of claim 13, wherein the storage device comprises a solid-state drive (SSD) and the command request is submitted by a storage driver to a non-volatile memory express (NVMe) controller of the SSD.

17. The computing device of claim 13, wherein the storage device is configured to interleave the metadata segments, retrieved based on the pointer to the allocated memory page in the extended PRP list, and the data segments in flash media of the storage device.

18. The computing device of claim 13, wherein a size of the allocated memory page corresponds to a size of each of the memory buffers representing the data segments.

19. The computing device of claim 13, wherein the processor is further configured to execute the machine executable code to further cause the processor to mark the pointer to indicate that the pointer references the memory page storing metadata segments prior to submitting the command request.

20. The computing device of claim 13, wherein the processor is further configured to execute the machine executable code to further cause the processor to retrieve the metadata segments from the other memory buffers based on the other pointers in the SGL prior to copying the metadata segments.

* * * * *